United States Patent [19]

Nelson

[11] Patent Number: 5,364,435

[45] Date of Patent: Nov. 15, 1994

[54] METHOD OF INTRODUCING PROTECTIVE ATMOSPHERE GASES INTO A GLASS FORMING CHAMBER

[75] Inventor: Douglas M. Nelson, Curtice, Ohio

[73] Assignee: Libbey-Owens-Ford Co., Toledo, Ohio

[21] Appl. No.: 979,662

[22] Filed: Nov. 20, 1992

[51] Int. Cl.$^5$ .............................................. C03B 18/20
[52] U.S. Cl. .................................... 65/32.5; 65/66; 65/99.2; 65/157; 65/182.3
[58] Field of Search ............... 65/32.5, 32.1, 84, 99.2, 65/99.3, 99.4, 182.1, 182.2, 182.3, 157, 119, 66

[56] References Cited

U.S. PATENT DOCUMENTS

| | | | |
|---|---|---|---|
| 3,083,551 | 4/1963 | Pilkington | 65/32.5 |
| 3,332,763 | 7/1967 | Basler et al. | 65/32.5 |
| 3,337,319 | 8/1967 | Edwards | 65/27 |
| 3,337,322 | 8/1967 | Taylor | 65/32.5 |
| 3,351,451 | 11/1967 | Barradell-Smith et al. | 65/157 |
| 3,356,476 | 12/1967 | Gulotta | 65/27 |
| 3,423,197 | 1/1969 | Loukes et al. | 65/32.5 |
| 3,462,253 | 8/1969 | Sensi | 65/99.4 |
| 3,507,637 | 4/1970 | Javaux | 65/157 |
| 3,551,126 | 12/1970 | Sacrez et al. | 65/27 |
| 3,594,143 | 7/1971 | Mohyuddin | 65/32.5 |
| 3,595,635 | 7/1971 | Nixon | 65/157 |
| 3,630,701 | 12/1971 | Javaux et al. | 65/27 |
| 3,721,543 | 3/1973 | Classen et al. | 65/146 |
| 3,970,442 | 7/1976 | Gulotta | 65/32.5 |
| 3,976,460 | 8/1976 | Kompare et al. | 65/32.5 |
| 4,081,262 | 3/1978 | Fuhrman et al. | 65/32.5 |

Primary Examiner—W. Gary Jones
Assistant Examiner—Steven P. Griffin
Attorney, Agent, or Firm—Marshall & Melhorn

[57] ABSTRACT

A method of introducing a reducing gas and an inert gas into a glass forming chamber at a plurality of locations along the length of the chamber by means of a system which permits delivery of a mixture of the reducing and inert gases to all such locations, or delivery of only the inert gas at certain of the locations. A significantly greater proportion of the reducing gas is introduced into the service space above the bath proximate the inlet end thereof. Further, the total amount of reducing gas which must be introduced to maintain a reducing bath atmosphere is minimized as a result of the location of such introduction. The present invention provides for a more conservative use of reducing gases such as hydrogen.

12 Claims, 1 Drawing Sheet

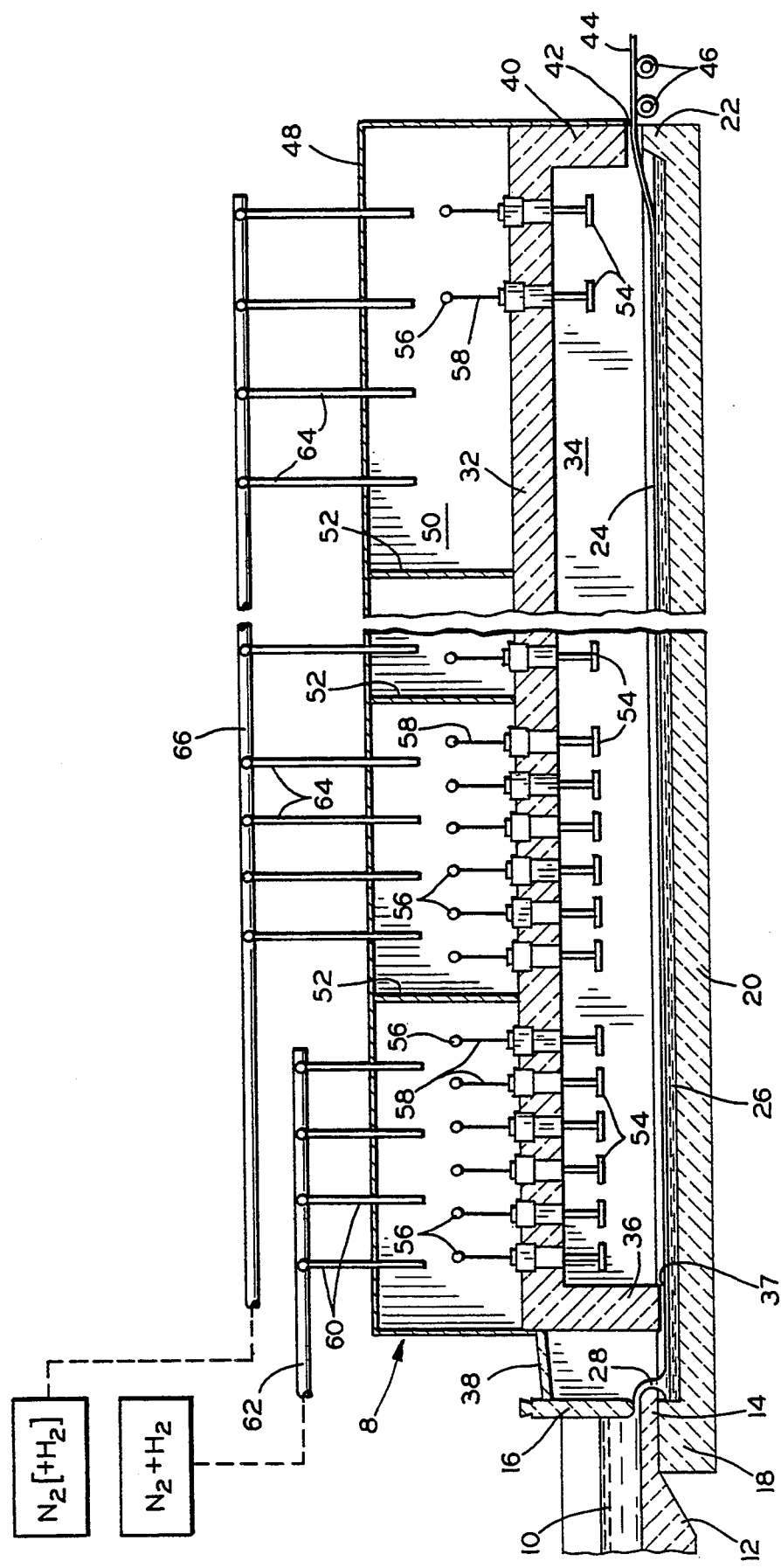

METHOD OF INTRODUCING PROTECTIVE ATMOSPHERE GASES INTO A GLASS FORMING CHAMBER

BACKGROUND OF THE INVENTION

1. Field of the Invention

The present invention relates to a method for manufacturing flat glass in which the glass is formed while being supported on the surface of a pool of molten metal. More particularly, the invention relates to a method for introducing protective atmosphere gases into a chamber in which the glass is formed.

2. Summary of Related Art

In a variety of processes, a continuous ribbon of glass is formed while supported on and advancing along the surface of a pool of molten metal. In general, a protective reducing atmosphere is created in a head space above the advancing glass ribbon and the supporting pool of molten metal in order to prevent the oxidation of the molten metal and, consequently, the contamination of the glass. Patents illustrating the use of such a protective atmosphere in glass making operations include: U.S. Pat. No. 3,594,143 to Mohyuddin; U.S. Pat. No. 3,551,126 to Source et al.; U.S. Pat. No. 3,423,197 to Loukes, et al.; U.S. Pat. No. 3,462,253 to Seusi; U.S. Pat. No. 3,551,126 to Sacrez et al.; U.S. Pat. No. 3,423,197 to Edwards; U.S. Pat. No. 3,337,322 to Taylor; U.S. Pat. No. 3,630,701 to Javaux; U.S. Pat. No. 3,970,442 to Gulotta; U.S. Pat. No. 3,976,460 to Kompare, et al.

All of these patents show the introduction or migration of protective atmosphere gases into a head space overlying an advancing continuous ribbon of glass supported on a pool of molten metal.

It is common practice to introduce protective gases of varying compositions into different portions of the service space or plenum above the roof of a glass forming chamber, so that controlled amounts of protective gases flow down through the permeable roof at different locations along the length of the chamber. For example, Taylor, in U.S. Pat. No. 3,337,322, shows the introduction of a protective gas comprising from 0.25 to 3.0 percent hydrogen in nitrogen into a plenum, or service space, near the inlet end of a chamber while introducing a protective gas comprising from 3.0 to 10 percent hydrogen in nitrogen into the plenum near the outlet end of the chamber.

Further, in U.S. Pat. No. 3,970,442, Gulotta discloses the introduction of a reducing gas such as hydrogen directly into the headspace of a glass forming chamber at locations generally well downstream from the inlet or hot end where the molten glass is fed to the forming chamber. In addition, an inert gas such as nitrogen is introduced into the service space or plenum of the forming chamber which is separated from the headspace by a permeable roof.

SUMMARY OF THE INVENTION

The present invention relates to a method of introducing a reducing gas and an inert gas into a float glass bath chamber having an inlet end and an outlet end, wherein a continuous glass ribbon is conveyed on a bath of molten tin within the chamber. These gases are introduced at a plurality of locations along the length of the chamber by means of a system which permits delivery of a mixture of the reducing and inert gases to all such locations, or delivery of only the inert gas at certain of the locations. Preferably, the reducing gas and the inert gas are introduced into the service space above the permeable roof of the float glass bath chamber at sufficient pressure to create a positive pressure in the service space, causing the gases to flow through the roof and into a head space provided above the molten tin bath. According to the present invention, a significantly greater proportion of the reducing gas is introduced into the service space above the bath proximate the inlet end thereof. Further, the total amount of reducing gas which must be introduced to maintain a reducing bath atmosphere in the glass forming chamber is minimized as a result of the location of such introduction.

The present invention thereby provides for a more conservative use of hydrogen or other reducing gases by providing more efficient removal of impurities from the bath atmosphere. The combination of high hydrogen concentration and high temperature at the inlet end of the bath results in a more efficient use of the hydrogen introduced. Additionally, introducing a substantial portion of the hydrogen into the forming chamber proximate its inlet end provides a longer average residence time, which results in additional efficiencies in the use of the hydrogen. The present invention thus provides a reduction in the total requirement of relatively expensive reducing gases, such as hydrogen, which are needed to maintain a reducing atmosphere in the glass forming chamber.

BRIEF DESCRIPTION OF THE DRAWING

The above, as well as other advantages of the present invention, will become readily apparent to those skilled in the art from the following detailed description of a preferred embodiment when considered in the light of the accompanying single FIGURE drawing, which is a somewhat schematic vertical sectional view of a glass forming chamber in which the present invention is conveniently practiced.

DESCRIPTION OF THE PREFERRED EMBODIMENT

Referring now to the drawing, there is illustrated a glass forming chamber 8 in which molten glass 10 is being delivered in a conventional manner along a canal 12 leading from the forehearth of a glass melting furnace (not shown). The canal 12 terminates in a spout having a lip 14. The flow of molten glass, usually soda-lime-silica glass, to the spout is controlled by a regulating tweel 16. The spout extends over an inlet end wall 18 of a tank structure comprising a floor 20, an outlet end wall 22 and side walls 24. The tank structure contains a bath of molten metal 26, usually molten tin or a tin alloy in which tin predominates, and molten glass flows as indicated at 28 over the spout lip 14 onto the surface of the molten metal bath 26 at the inlet end of the forming chamber 8. A roof structure 32 is supported over the tank structure and defines a head space 34 above the molten metal bath 26. The roof structure 32 has an inlet end wall 36 which depends downwardly therefrom. The inlet end wall 36 extends down near to the surface of the molten metal bath 26 at the inlet end of the forming chamber 8 to provide an inlet 37 of restricted height. An extension 38 of the roof structure extends across to the tweel 16 to provide a chamber in which the spout is enclosed.

The roof structure 32 also has a downwardly depending wall 40 at the outlet end of the forming chamber 8 defining an outlet opening 42. A ribbon of glass 44 produced on the bath exits from the outlet 42 between the lower face of the outlet end wall 40 of the roof structure 32 and the upper face of the outlet end wall 22 of the tank structure. Driven traction rollers 46 are mounted beyond the outlet 42 with the upper surface of the rollers just above the level of the upper surface of the bath end wall 22, so that the ribbon of glass 44 is lifted gently from the bath surface for discharge horizontally away from the outlet 42 on the rollers 46.

The glass forming chamber 8 includes a casing 48 surrounding the roof structure and forming a plenum or service space 50. The casing 48 includes a series of partitions 52 which extend generally vertically from the casing 48 to the roof 32 to divide the service space 50 into a plurality of separate chambers. The casing 48 and partitions 52 are preferably constructed of an impervious material which is not readily penetrated by gases, such as air from the outside environment or the protective gases used to maintain a reducing atmosphere in the head space 34.

The temperature within the glass forming chamber 8 is controlled by electric heating elements, indicated at 54, which are mounted in the roof 32 and extend into the head space 34. The heating elements 54 at the inlet end of the glass forming chamber 8 maintain the temperature in the region of one thousand degrees centigrade. Heating elements 54 are also conveniently located near the outlet end of the glass forming chamber 8 in order to selectively adjust and maintain the temperature of the glass as it is prepared for removal from the bath and withdrawal from the forming chamber 8. A temperature gradient is maintained down the bath from the temperature of about one thousand degrees centigrade at the inlet end of the bath to a temperature in the range of about five hundred seventy degrees centigrade to six hundred fifty degrees centigrade at the outlet end, where the ribbon of glass is discharged from the glass forming chamber 8. At this lower temperature at the outlet end, the glass is sufficiently stiffened to be unharmed by its contact with the traction rollers 46, but can still be lifted from the bath surface as illustrated.

The heating elements 54 are operably connected to bus bars 56 which extend through electrically insulated collars mounted in the casing 48, and are connected to a source of electric power (not shown). The heating elements 54 are preferably connected to the bus bars 56 in a conventional manner by electrical connecting straps 58.

A protective atmosphere must be maintained in the head space 34 over the bath to avoid oxidation of the molten metal and resultant contamination of the glass. In accordance with the present invention, a first protective gas comprising a reducing gas and an inert gas is supplied to the headspace proximate the inlet end of the glass forming chamber 8 to maintain a reducing atmosphere therein. The first protective gas may be introduced directly into the head space 34, but is preferably introduced into the service space 50 above the glass forming chamber 8 proximate its inlet end. The first protective gas is introduced through ducts 60 connected to a common header 62 and extending downwardly through the casing 48 into the service space 50 above the bath proximate the inlet end thereof. The first protective gas is introduced at sufficient pressure to create a positive pressure in the service space 50, causing the gases to flow through the permeable roof 32 and into the head space 34 provided above the inlet end of the molten tin bath 26.

The reducing gas of the first protective gas may be any suitable reducing gas, such as forming gas, coal gas, carbon monoxide, hydrogen, and the like. When, as is typical, the molten metal used in the forming chamber 8 as a support for the glass during forming is tin or an alloy of tin, a mixture of hydrogen and nitrogen is a preferred first protective gas. The first protective gas may comprise about 5 to 12 percent by volume hydrogen and about 88 to 95 percent by volume nitrogen and, preferably, comprises about 7 to 10 percent by volume hydrogen and about 90 to 93 percent by volume nitrogen.

Additionally, a sufficient amount of a second protective gas, preferably comprising an inert gas such as nitrogen, is supplied to the head space 34 proximate the outlet end of the glass forming chamber 8 to maintain a reducing atmosphere therein. The second protective gas may be introduced directly into the head space 34, but is preferably introduced into the service space 50 above the length of the glass forming chamber 8 downstream from the locations at which the first protective gas is introduced. The second protective gas is introduced through ducts 64 connected to a common header 66 and extending downwardly through the casing 48 into the service space 50 above the bath proximate the outlet end thereof. The second protective gas may include from about 0 to 5 percent of a reducing gas, such as hydrogen, but has a significantly lesser proportion of reducing gas than does the first protective gas.

The first protective gas flows downstream from the inlet end to the outlet end of the glass forming chamber 8, following the flow of the ribbon of glass 44. It thus eventually flows into that portion of the head space 34 which the second protective gas has been introduced. Consequently, the concentration of the reducing gas gradually decreases downstream due to dilution with the second protective gas, which has a relatively lesser concentration of the reducing gas.

The introduction or migration of the first protective gas, including a substantial proportion of the total amount of reducing gas, into the head space 34 proximate the inlet end of the glass forming chamber 8 is advantageous in that the reactions by which the reducing gas, preferably hydrogen, prevents oxidation of the molten metal bath 26 proceed more rapidly in the higher temperatures and higher concentration of reducing gas which are thereby provided near the inlet end of the chamber 8. Further, by providing a substantial portion of the reducing gas near the inlet end of the chamber 8, the average residence time of the reducing gas within the glass forming chamber is significantly increased, resulting in a more effective use of the reducing gas. Overall, the method according to the present invention should significantly reduce the total amount of reducing gas which must be introduced to maintain a reducing bath atmosphere in the glass forming chamber.

The specific compositions of the first and second protective gases, as well as the specific locations of their introduction into the glass forming chamber, are preferably determined for a given application so as to minimize the total amount of reducing gas which must be introduced to maintain a reducing bath atmosphere in the glass forming chamber. Thus, by way of an example, it may be that for a specific application the total amount of reducing gas required is minimized by introducing a first protective gas comprised of about 8 percent hydrogen and about 92 percent nitrogen into the service space above about the first third of the chamber adjacent the inlet end, and a second protective gas comprised of about 2 percent hydrogen and about 98 percent nitrogen into the service space above the remainder of the length of the chamber.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of introducing a reducing gas and an inert gas into a glass forming chamber having an inlet end, an outlet end and a length therebetween, wherein a continuous glass ribbon is conveyed on a bath of molten tin, oxidation of said molten tin being prevented by a protective gaseous atmosphere created in a head space provided above the molten tin bath within said chamber, said gases being introduced at a plurality of locations along the length of the glass forming chamber by means of a system which permits delivery of a mixture of the reducing and inert gases to all of said plurality of locations, or delivery of only the inert gas at certain of said locations, the improvement comprising the steps of:
    a. introducing a first protective gas comprised of a reducing gas and an inert gas into a service space provided above a permeable roof of the glass forming chamber proximate the inlet end of said chamber at sufficient pressure to create a positive pressure in said service space, causing said first protective gas to flow through the permeable roof and into said head space; and
    b. introducing a second protective gas comprised of an inert gas into the glass forming chamber proximate the outlet end thereof, wherein said first protective gas has a greater proportion of reducing gas than does said second protective gas.

2. The method according to claim 1, wherein said second protective gas is introduced into said service space at sufficient pressure to create a positive pressure in the service space, causing said second protective gas to flow through the permeable roof and into said head space.

3. The method according to claim 1, wherein said second protective gas is comprised of a reducing gas and an inert gas.

4. The method according to claim 1, wherein the reducing gas comprises hydrogen, and the inert gas comprises nitrogen.

5. The method according to claim 4, wherein said first protective gas comprises about 5 to 12 percent by volume hydrogen and about 88 to 95 percent by volume nitrogen.

6. The method according to claim 5, wherein said first protective gas comprises about 7 to 10 percent by volume hydrogen and about 90 to 93 percent by volume nitrogen.

7. The method according to claim 4, wherein said second protective gas comprises about 0.0 to 5 percent by volume hydrogen and about 95 to 100 percent by volume nitrogen.

8. A method of introducing a reducing gas and an inert gas into a service space formed above a permeable roof of a float glass bath chamber having an inlet end and an outlet end and a length therebetween, wherein a continuous glass ribbon is conveyed on a bath of molten tin, oxidation of said molten tin being prevented by a protective gaseous atmosphere created in a head space provided above said bath within said chamber, said gases being introduced at a plurality of locations along the length of said chamber by means of a system which permits delivery of a mixture of the reducing and inert gases to all of said plurality of locations, or delivery of only the inert gas at certain of said locations, at sufficient pressure to create a positive pressure in the service space, causing the gases to flow through said permeable roof and into said head space, the improvement comprising the steps of:
    a. introducing a greater proportion of the reducing gas into the service space proximate the inlet end of said chamber than the outlet end thereof; and
    b. minimizing the total amount of reducing gas which must be introduced to maintain a reducing bath atmosphere, as a result of the location at which said greater proportion of reducing gas is introduced.

9. The method according to claim 8, wherein the reducing gas comprises hydrogen, and the inert gas comprises nitrogen.

10. The method according to claim 9, wherein the protective atmosphere comprises 5 to 12 percent by volume hydrogen and 88 to 95 percent by volume nitrogen proximate the inlet end of the float glass bath chamber.

11. The method according to claim 10, wherein the protective atmosphere comprises 7 to 10 percent by volume hydrogen and 90 to 93 percent by volume nitrogen proximate the inlet end of the float glass bath chamber.

12. A method of introducing a reducing gas and an inert gas into a glass forming chamber having an inlet end, an outlet end and a length therebetween, wherein a continuous glass ribbon is conveyed on a bath of molten tin, oxidation of said molten tin being prevented by a protective gaseous atmosphere created in a head space provided above the molten tin bath within said chamber, said gases being introduced at a plurality of locations along the length of the glass forming chamber by means of a system which permits delivery of a mixture of the reducing and inert gases to all of said plurality of locations, or delivery of only the inert gas at certain of said locations, the improvement comprising the steps of:
    a. Introducing a first protective gas comprised of a reducing gas and an inert gas into that portion of the head space beginning at said inlet end of the glass forming chamber and extending about one-third of the length of said chamber therefrom; and
    b. Introducing a second protective gas comprised of an inert gas into that portion of the head space proximate said outlet end of the glass forming chamber and extending about the remaining two-thirds of the length of said head space therefrom, wherein said first protective gas has a greater proportion of reducing gas than does said second protective gas.

* * * * *